United States Patent
Nakahira et al.

(10) Patent No.: US 12,238,644 B2
(45) Date of Patent: Feb. 25, 2025

(54) WIRELESS COMMUNICATION METHOD, BASE STATION, AND WIRELESS COMMUNICATION SYSTEM

(71) Applicant: NIPPON TELEGRAPH AND TELEPHONE CORPORATION, Tokyo (JP)

(72) Inventors: Toshiro Nakahira, Musashino (JP); Tomoki Murakami, Musashino (JP); Hirantha Abeysekera, Musashino (JP); Koichi Ishihara, Musashino (JP); Takafumi Hayashi, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 729 days.

(21) Appl. No.: 17/603,668

(22) PCT Filed: Apr. 17, 2020

(86) PCT No.: PCT/JP2020/016895
§ 371 (c)(1),
(2) Date: Oct. 14, 2021

(87) PCT Pub. No.: WO2020/218198
PCT Pub. Date: Oct. 29, 2020

(65) Prior Publication Data
US 2022/0201602 A1    Jun. 23, 2022

(30) Foreign Application Priority Data

Apr. 22, 2019 (JP) ................................ 2019-081322

(51) Int. Cl.
*H04W 48/18* (2009.01)
*H04L 41/0893* (2022.01)
(Continued)

(52) U.S. Cl.
CPC ......... *H04W 48/18* (2013.01); *H04L 41/0893* (2013.01); *H04W 8/22* (2013.01); *H04W 28/0925* (2020.05)

(58) Field of Classification Search
CPC ... H04W 48/18; H04W 28/0925; H04W 8/22; H04L 41/0893
(Continued)

(56) References Cited

U.S. PATENT DOCUMENTS

| 2004/0053606 A1* | 3/2004 | Artamo ................. H04W 28/18 455/422.1 |
| 2008/0070578 A1* | 3/2008 | Flore ................. H04W 36/0055 455/438 |

(Continued)

FOREIGN PATENT DOCUMENTS

| JP | 2012529229 A | 11/2012 |
| JP | 2015529985 A | 10/2015 |

OTHER PUBLICATIONS

The 802.11 Working Group of the LAN/MAN Standards Committee of the IEEE Computer Society, Part 11: Wireless LAN Medium Access Control (MAC) and Physical Layer (PHY) Specifications, IEEE Std 802.11-2016, IEEE Standard for Information technology—Telecommunications and information exchange between systems Local and metropolitan area networks—Specific requirements, Dec. 2016.

*Primary Examiner* — William Nealon
(74) *Attorney, Agent, or Firm* — Harness, Dickey & Pierce, P.L.C.

(57) ABSTRACT

A radio communication method of connecting a base station with a plurality of terminal stations, the base station including a plurality of radio communication units compatible with a plurality of communication standards or communication schemes, the method including collecting, from each of the plurality of terminal stations, communication quality infor- (Continued)

mation representing a communication quality of the terminal station, collecting, from each of the plurality of terminal stations, communication performance information representing a communication performance of the terminal station, collecting, from each of the plurality of terminal stations, identifier information that identifies the terminal station, calculating, based on the communication quality information, the communication performance information and the identifier information that are collected, a setting policy including a setting for each of the plurality of radio communication units, and a switching policy of setting a condition for switching the plurality of radio communication units, and setting, for each of the plurality of radio communication units, the terminal station to be connected based on the setting policy and the switching policy that are calculated.

5 Claims, 10 Drawing Sheets

(51) Int. Cl.
*H04W 8/22* (2009.01)
*H04W 28/08* (2023.01)

(58) Field of Classification Search
USPC .......................................................... 370/329
See application file for complete search history.

(56) References Cited

U.S. PATENT DOCUMENTS

| | | | |
|---|---|---|---|
| 2010/0302958 A1* | 12/2010 | Wietfeldt | H04W 76/15 370/252 |
| 2015/0208336 A1* | 7/2015 | Iihoshi | H04M 15/8005 455/435.2 |
| 2018/0160416 A1* | 6/2018 | Mitsui | H04W 88/06 |
| 2022/0086759 A1* | 3/2022 | Höglund | H04W 68/005 |

* cited by examiner

| POLICY NUMBER | APPLICATION DESTINATION RADIO COMMUNICATION UNIT | RADIO SETTING | CONNECTION PERMISSION SETTING |
|---|---|---|---|
| 01 | RADIO COMMUNICATION UNIT 21-1 ⋮ | • SSID STEALTH DISABLED<br>• CH36,40<br>• BW20MHz | ALL TERMINALS |
| 02 | RADIO COMMUNICATION UNIT 21-2 ⋮ | • SSID STEALTH ENABLED<br>• CH60,64<br>• BW40MHz | NO TERMINAL |
| 03 | RADIO COMMUNICATION UNIT 21-3 ⋮ | • SSID STEALTH ENABLED<br>• CH100,104,108,112<br>• BW20MHz<br>• OBSS_PD ENABLED | NO TERMINAL |
| ⋮ | ⋮ | ⋮ | ⋮ |

Fig. 5

| POLICY NUMBER | SETTING POLICY NUMBER OF SWITCHING SOURCE | SETTING POLICY NUMBER OF SWITCHING DESTINATION | SWITCHING CONDITION |
|---|---|---|---|
| I | 01 | 02 | TERMINAL STATION OF TYPE ii |
| II | 01 | 03 | TERMINAL STATION TYPE iii |
| ⋮ | ⋮ | ⋮ | ⋮ |

Fig. 6

| TYPE NUMBER | COMMUNICATION SCHEME WITH WHICH TERMINAL STATION 4 IS COMPATIBLE | |
|---|---|---|
| | COMPATIBILITY WITH 40 MHz TRANSMISSION | COMPATIBILITY WITH OBSSPD TRANSMISSION |
| i | × | × |
| ii | ○ | Φ |
| iii | Φ | ○ |
| ⋮ | ⋮ | ⋮ |

○ : COMPATIBLE
× : NOT COMPATIBLE
Φ : NOT CARED

Fig. 7

WIRELESS COMMUNICATION METHOD, BASE STATION, AND WIRELESS COMMUNICATION SYSTEM

CROSS-REFERENCE TO RELATED APPLICATIONS

This application is a 371 U.S. National Phase of International Application No. PCT/JP2020/016895 filed on Apr. 17, 2020, which claims priority to Japanese Application No. 2019-081322 filed on Apr. 22, 2019. The entire disclosures of the above applications are incorporated herein by reference.

TECHNICAL FIELD

The present invention relates to a radio communication method, a base station and a radio communication system.

BACKGROUND ART

As a high-speed wireless access system using radio waves of a license-free band, there is the IEEE 802.11 wireless LAN standard, which specifies various standards such as 11a, 11b, 11g, 11n and 11ac with different wireless frequency bands, radio transmission techniques, and radio transmission rates.

The 11b standard is a radio transmission rate of up to 11 Mbps using the 2.4 GHz band. The 11a standard is a radio transmission rate of up to 54 Mbps using the 5 GHz band. The 11g standard is a radio transmission rate of up to 54 Mbps using the 2.4 GHz band. The 11n standard is a radio transmission rate of up to 600 Mbps utilizing 2.4 and 5 GHz bands. The 11ac standard is a radio transmission rate of up to 6900 Mbps using the 5 GHz.

These various IEEE 802.11 wireless LAN standards are backward compatible and can be used in a mixed environment.

In addition, in the IEEE 802.11 wireless LAN standard, an infrastructure mode for communication via a base station is used in many cases. Each terminal station selects the connection destination based on its own station connection profile information (such as a service set identifier (SSID), a wireless encryption system, and a passphrase), and connects to the base station.

In addition, the terminal station performs two operations, a passive scan and an active scan, to find the base station to which it is connected. In the passive scan, the terminal station receives a beacon frame that is periodically transmitted from the base station to the surrounding area. In the active scan, the terminal station transmits a probe request frame to the base station and receives a probe response from the base station. This enables the terminal station to find a base station that matches its own wireless connection profile information and start a wireless connection.

CITATION LIST

Non Patent Literature

[NPTL 1]
IEEE Std 802.11-2016, December 2016.

SUMMARY OF THE INVENTION

Technical Problem

In an environment using a wireless system, terminal stations with different standards and/or communication schemes may be mixed, and the terminal stations may use different radio communication standards to perform a radio communication with a base station compatible with a plurality of standards and/or communication schemes. In such an environment, the radio transmission efficiency of the entire system is disadvantageously reduced due to the mixture of an old standard with inferior transmission efficiency.

In order to improve the radio transmission efficiency, it is conceivable to avoid the mixed environment by adopting a configuration in which the base station includes a plurality of radio communication units to segregate the type of the terminal station to be accommodated for each radio communication unit. In this case, the base station needs to collect information required for the connection destination control from the terminal station. In the related art, however, the base station individually collects information from the terminal station.

For example, in the case where a terminal station moves and the connection destination is switched from one base station to another, the base station to which the switch is made needs to newly collect required information from the terminal station to perform determination and control based on the collected information. That is, in the system as a whole, it is necessary to repeatedly perform the information collection from the terminal station, which increases the cost for control. In addition, even when the base station controls the wireless connection with the terminal station, the wireless connection destination may be autonomously switched on the terminal station side, thus making it difficult to maintain the controlled wireless connection state.

An object of the present invention is to provide a radio communication method, a base station and a radio communication system that can suppress a reduction in transmission efficiency in the case where there is a plurality of connection destinations for a terminal station.

Means for Solving the Problem

A radio communication method according to an aspect of the present invention is a method of connecting a base station with a plurality of terminal stations, the base station including a plurality of radio communication units compatible with a plurality of communication standards or communication schemes, the method including collecting, from each of the plurality of terminal stations, communication quality information representing a communication quality of the terminal station, collecting, from each of the plurality of terminal stations, communication performance information representing a communication performance of the terminal station, collecting, from each of the plurality of terminal stations, identifier information that identifies the terminal station, calculating, based on the communication quality information, the communication performance information and the identifier information that are collected, a setting policy including a setting for each of the plurality of radio communication units, and a switching policy of setting a condition for switching the plurality of radio communication units, and setting, for each of the plurality of radio communication units, the terminal station for which connection permission and switching are to be performed based on the setting policy and the switching policy that are calculated.

The radio communication method according to an aspect of the present invention further including storing the communication quality information, the communication performance information and the identifier information that are collected, and transmitting, to another base station, the communication quality information, the communication performance information and the identifier information that are stored.

In the radio communication method according to an aspect of the present invention, the calculating includes calculating a setting policy that disables a stealth SSID for one or more of the plurality of radio communication units and enables the stealth SSID for the other radio communication units, and a switching policy that performs connection switching of the plurality of terminal stations in accordance with a plurality of types based on a compatible communication scheme of each of the plurality of radio communication units.

A base station according to an aspect of the present invention is configured to connect a plurality of terminal stations, the base station including a plurality of radio communication units compatible with a plurality of communication standards or communication schemes, a communication quality collection unit configured to collect, from each of the plurality of terminal stations, communication quality information representing a communication quality of the terminal station, a communication performance collection unit configured to collect, from each of the plurality of terminal stations, communication performance information representing a communication performance of the terminal station, an identifier collection unit configured to collect, from each of the plurality of terminal stations, identifier information that identifies the terminal station, and a setting unit configured to set, for each of the plurality of radio communication units, the terminal station to be connected in accordance with a switching policy of setting a condition for switching the plurality of radio communication units and a setting policy including a setting for each of the plurality of radio communication units, the switching policy and the setting policy being calculated based on the communication quality information, the communication performance information and the identifier information that are collected.

In the base station according to an aspect of the present invention, the setting unit sets, for each of the plurality of radio communication units, the terminal station to be connected in accordance with a setting policy that disables a stealth SSID for one or more of the plurality of radio communication units and enables the stealth SSID for the other radio communication units, and a switching policy that performs connection switching of the plurality of terminal stations in accordance with a plurality of types based on a compatible communication scheme of each of the plurality of radio communication units.

A radio communication system according to an aspect of the present invention includes a plurality of base stations including a plurality of radio communication units that are compatible with a plurality of communication standards or communication schemes and are connectable to a plurality of terminal stations, and a control station configured to control the plurality of base stations, wherein each of the plurality of base stations includes a communication quality collection unit configured to collect, from each of the plurality of terminal stations, communication quality information representing a communication quality of the terminal station, a communication performance collection unit configured to collect, from each of the plurality of terminal stations, communication performance information representing a communication performance of the terminal station, an identifier collection unit configured to collect, from each of the plurality of terminal stations, identifier information that identifies the terminal station, and a setting unit configured to set, for each of the plurality of radio communication units, the terminal station to be connected based on a setting policy and a switching policy, and the control station includes a policy calculation unit configured to calculate a switching policy of setting a condition for switching the plurality of radio communication units and a setting policy including a setting for each of the plurality of radio communication units based on the communication quality information, the communication performance information and the identifier information that are collected by each of the plurality of base stations, and a communication unit configured to transmit, to each of the plurality of base stations, the setting policy and the switching policy that are calculated by the policy calculation unit.

In the radio communication system according to an aspect of the present invention, the control station further includes a storage unit configured to store the communication quality information, the communication performance information and the identifier information that are collected by each of the plurality of base stations, and the communication unit transmits, to another base station, the communication quality information, the communication performance information and the identifier information that are stored in the storage unit.

In the radio communication system according to an aspect of the present invention, the policy calculation unit calculates a setting policy that disables a stealth SSID for one or more of the plurality of radio communication units and enables the stealth SSID for the other radio communication units, and a switching policy that performs connection switching of the plurality of terminal stations in accordance with a plurality of types based on a compatible communication scheme of each of the plurality of radio communication units.

Effects of the Invention

According to the present invention, it is possible to suppress a reduction in transmission efficiency in the case where there is a plurality of connection destinations for a terminal station.

BRIEF DESCRIPTION OF DRAWINGS

FIG. 5 illustrates an exemplary setting policy.

FIG. 6 illustrates an exemplary switching policy.

FIG. 7 illustrates exemplary type information of a terminal station.

DESCRIPTION OF EMBODIMENTS

Figure 1:
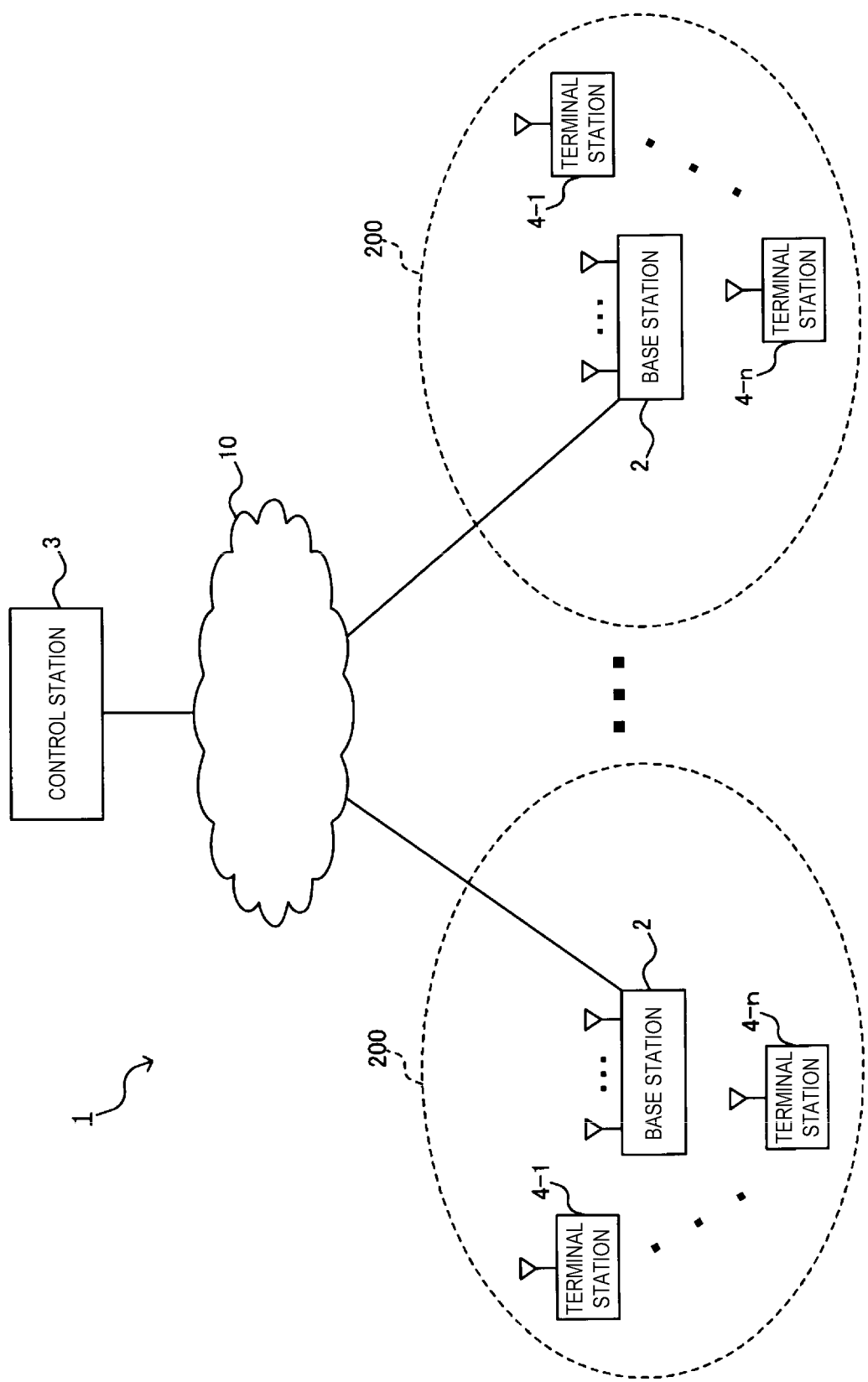
FIG. 1 illustrates an exemplary configuration of a radio communication system according to an embodiment.

An embodiment of a radio communication system is described below with reference to the drawings. FIG. 1 illustrates an exemplary configuration of a radio communication system 1 according to an embodiment. As illustrated in FIG. 1, in the radio communication system 1, for example, a plurality of base stations 2 are connected to a control station 3 through a network 10. In addition, each base station 2 accommodates a plurality of various terminal stations such as n terminal stations 4-1 to 4-n within a service area 200, which is a range where radio communication is possible.

Here, the terminal stations 4-1 to 4-n indicate that terminal stations with different communication standards, communication schemes and the like are mixed. There is a plurality of types of communication standards, such as IEEE 802.11a, 11b, 11g, 11n and 11ac. In addition, there is a plurality of types of communication schemes that differ in their compatibility with communication parameters (40 MHz transmission, OBSS_PD scheme and the like described later with reference to FIGS. 5 and 7, etc.) in radio communication.

It is to be noted that the number n of the terminal stations 4 to be accommodated and the individual types of the terminal stations 4 may be different for each base station 2. In addition, the terminal stations 4-1 to 4-n are a plurality of terminal stations with different communication standards, communication schemes and the like, but when they are not individually specified, they are simply referred to as the terminal station 4.

Figure 2:
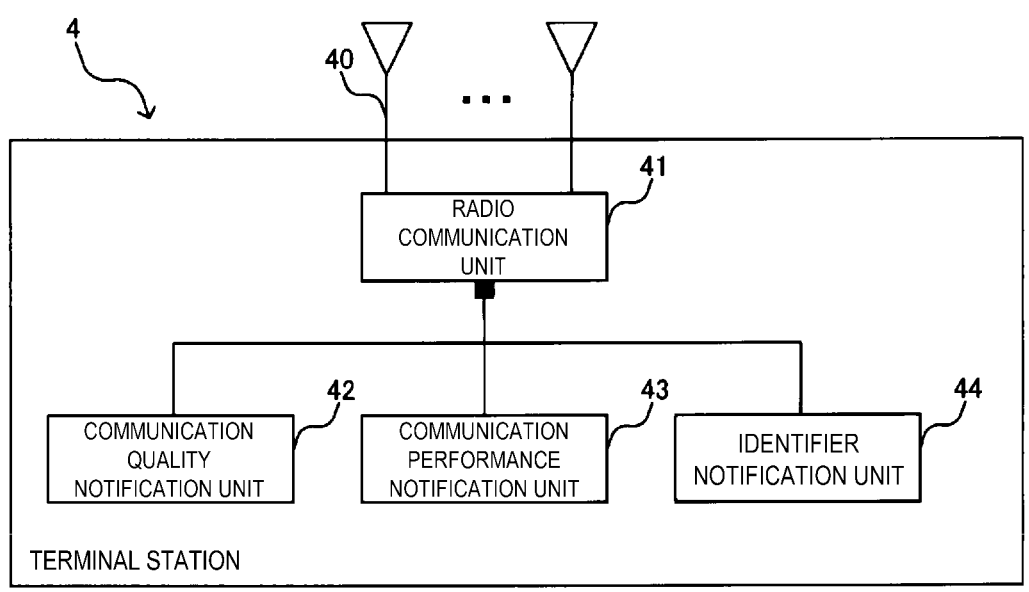
FIG. 2 illustrates an exemplary configuration of a terminal station.

FIG. 2 illustrates an exemplary configuration of the terminal station 4. As illustrated in FIG. 2, the terminal station 4 includes a plurality of antennas 40, a radio communication unit 41, a communication quality notification unit 42, a communication performance notification unit 43, and an identifier notification unit 44. It is to be noted that other function blocks that are provided in typical terminal stations are not illustrated.

The antenna 40, which is connected to the radio communication unit 41, transmits a wireless frame input from the radio communication unit 41, and outputs a received wireless frame to the radio communication unit 41.

The radio communication unit 41 puts information input from the communication quality notification unit 42, the communication performance notification unit 43, and the identifier notification unit 44 into wireless packets, and transmits them through the antenna 40, for example. It is to be noted that the terminal station 4 may be provided with a plurality of the radio communication units 41.

The communication quality notification unit 42 outputs communication quality information of its own station to notify the communication quality information of its own station to the base station 2 through the radio communication unit 41 and the antenna 40. The communication quality information includes information representing the communication quality of the terminal station such as the received signal-to-noise ratio (SNR) and the received power of a desired radio wave.

The communication performance notification unit 43 outputs communication performance information of its own station to notify the communication performance information of its own station to the base station 2 through the radio communication unit 41 and the antenna 40. The communication performance information includes information representing the radio communication performance of the terminal station 4, such as the number of the radio communication units 41, the number of the antennas 40, and the compatible radio communication standard.

The identifier notification unit 44 outputs identifier information of its own station to notify the identifier information of its own station to the base station 2 through the radio communication unit 41 and the antenna 40. The identifier information includes information that identifies the terminal station 4, such as the serial number and the media access control (MAC) address of the terminal station 4.

It is to be noted that each of the terminal stations 4-1 to 4-n has a configuration substantially identical to that of the terminal station 4 illustrated in FIG. 2, but the terminal stations 4-1 to 4-n are a plurality of terminal stations with different communication standards, communication schemes and the like as described above.

Figure 3:
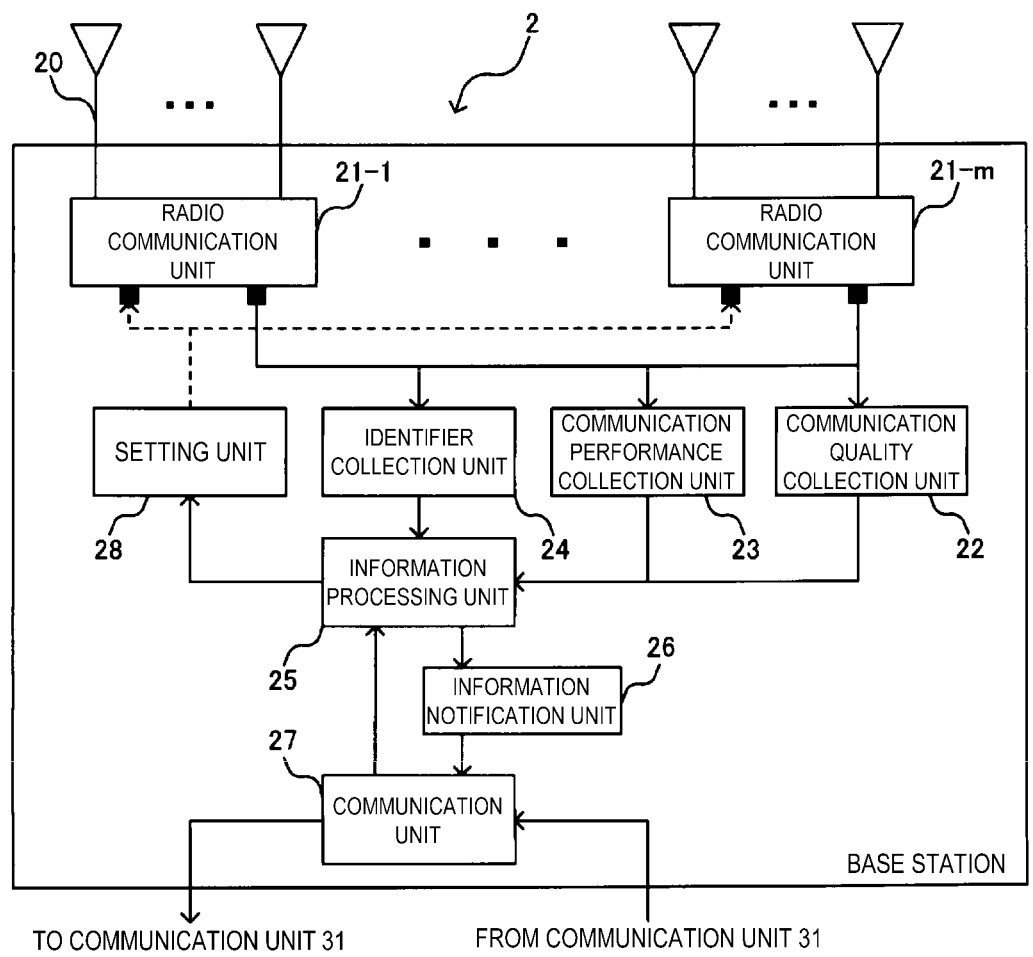
FIG. 3 illustrates an exemplary configuration of a base station according to an embodiment.

FIG. 3 illustrates an exemplary configuration of the base station 2 according to the embodiment. As illustrated in FIG. 3, the base station 2 includes a plurality of antennas 20, m radio communication units 21-1 to 21-m, a communication quality collection unit 22, a communication performance collection unit 23, an identifier collection unit 24, an information processing unit 25, an information notification unit 26, a communication unit 27, and a setting unit 28, for example. It is to be noted that when the plurality of configurations such as the radio communication units 21-1 to 21-m is not individually specified, they are simply abbreviated as a radio communication unit 21 or the like. In addition, other function blocks that are provided in typical base stations are not illustrated.

A plurality of the antennas 20, which is connected to each of the radio communication units 21-1 to 21-m, transmits a wireless frame input from the radio communication units 21-1 to 21-m and outputs a received wireless frame to the radio communication units 21-1 to 21-m.

The radio communication units 21-1 to 21-m can each independently perform radio communication with one or more terminal stations (for example, at least any of the terminal stations 4-1 to 4-n) through the plurality of antennas 20, for example. For example, each of the radio communication units 21-1 to 21-m is compatible with a plurality of communication standards and communication schemes, and performs radio communication according to any of the communication standards and communication schemes with the terminal station 4 in accordance with the setting based on a setting policy, a switching policy and a type information, and connection switching determination information described later.

The communication quality collection unit 22 collects communication quality information from each terminal station 4 through the plurality of antennas 20 and the radio communication units 21-1 to 21-m, and outputs it to the information processing unit 25.

The communication performance collection unit 23 collects the communication performance information of each terminal station 4 through the plurality of antennas 20 and the radio communication units 21-1 to 21-m, and outputs it to the information processing unit 25.

The identifier collection unit 24 collects identifier information that identifies the terminal station 4 from each terminal station 4 through the plurality of antennas 20 and the radio communication units 21-1 to 21-m, and outputs it to the information processing unit 25.

The information processing unit 25 includes a CPU and a memory (not illustrated), and combines together, as connection switching determination information for the terminal station 4, the communication quality information, the communication performance information and the identifier information input from the communication quality collection unit 22, the communication performance collection unit 23, and the identifier collection unit 24, respectively. Then, the information processing unit 25 outputs the connection switching determination information to the information notification unit 26 and the setting unit 28. In addition, the information processing unit 25 processes information input from the communication unit 27 (the setting policy, the switching policy and the type information described later), and outputs it to the setting unit 28.

The information notification unit 26 notifies, to control station 3, the connection switching determination information (the communication quality information, the communication performance information, and the identifier information) combined by the information processing unit 25 and base station performance information of its own station through the communication unit 27. The base station performance information is information representing the radio communication performance of the base station 2, and includes information such as the number (m) of the radio communication units 21, the number of the antennas 20, and the compatible communication standards and communication schemes.

The communication unit 27 transmits, to the control station 3 by, for example, a wired communication through the network 10 (FIG. 1), information (the connection switching determination information and the base station performance information of its own station) input from the information notification unit 26, and outputs, to the information processing unit 25, information (the setting policy, the switching policy and the type information described later) input from the control station 3.

The setting unit 28 performs a setting based on the setting policy, the switching policy and the type information input from the information processing unit 25 for each of the radio communication units 21-1 to 21-m. In addition, the setting unit 28 outputs, to each of the radio communication units 21-1 to 21-m, the connection switching determination information input from the information processing unit 25 to update the set switching policy. That is, the setting unit 28 has a function of setting the terminal station 4 to be connected for the radio communication units 21-1 to 21-m in accordance with the setting policy and the switching policy, and performs permission and switching of the connection of the terminal station 4.

Figure 4:
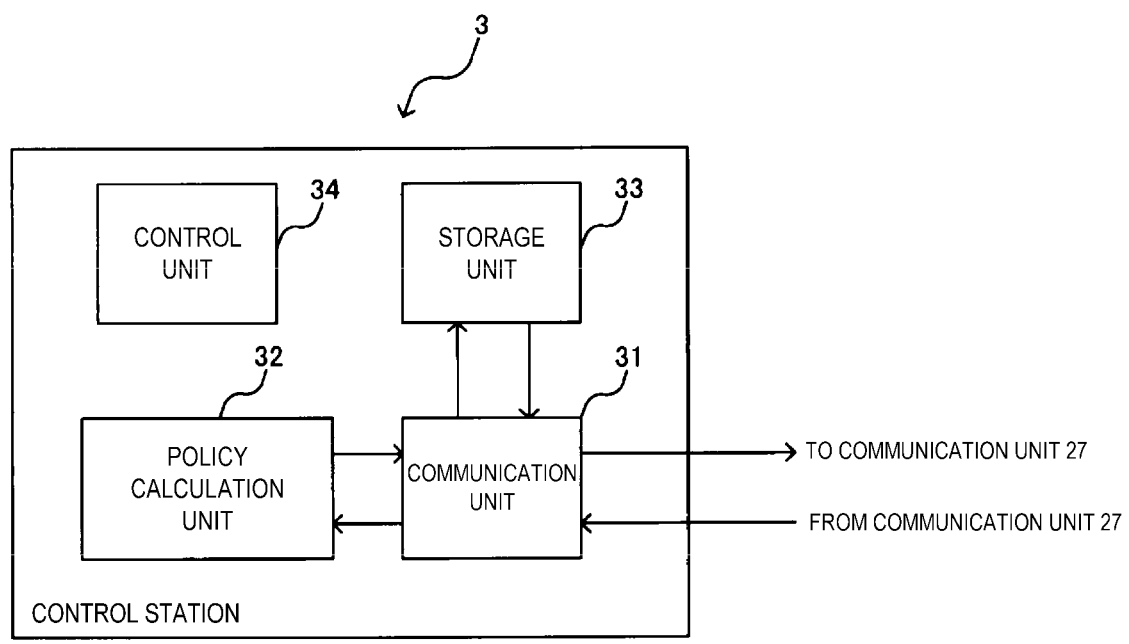
FIG. 4 illustrates an exemplary configuration of a control station.

FIG. 4 illustrates an exemplary configuration of the control station 3. As illustrated in FIG. 4, the control station 3 includes a communication unit 31, a policy calculation unit 32, a storage unit 33 and a control unit 34. It is to be noted that other function blocks that are provided in typical control stations are not illustrated.

The communication unit 31 receives base station performance information from each base station 2 by, for example, a wired communication through the network 10, and outputs it to the policy calculation unit 32. In addition, the communication unit 31 receives connection switching determination information from each base station 2, and outputs it to the storage unit 33 to store it in the storage unit 33. In addition, the communication unit 31 transmits, to each base station 2 through the network 10, each information calculated at the policy calculation unit 32 and the connection switching determination information stored in the storage unit 33.

On the basis of the base station performance information input from the communication unit 31, the policy calculation unit 32 calculates the setting policy, the switching policy, and the type information for specifying types of the terminal stations 4-1 to 4-n for the radio communication units 21-1 to 21-m of each base station 2, and outputs the calculated each information to the communication unit 31.

For example, the policy calculation unit 32 calculates a setting policy for a setting in which the stealth SSID is disabled for one or more units of the radio communication units 21-1 to 21-m, and the stealth SSID is enabled for the other units of the radio communication units 21-1 to 21-m. In addition, the policy calculation unit 32 calculates a switching policy for performing connection switching of the terminal stations 4-1 to 4-n in accordance with a plurality of types based on the compatible communication schemes of the radio communication units 21-1 to 21-m.

The storage unit 33 is a storage apparatus or the like that stores the connection switching determination information input from the communication unit 31.

The control unit 34 controls each unit of the control station 3. For example, the control unit 34 also controls the writing of information to the storage unit 33, the reading of information stored in the storage unit 33 and the like.

Next, specific examples of the setting policy, the switching policy and the type information are described.

FIG. 5 illustrates an exemplary setting policy. As illustrated in FIG. 5, the setting policy includes the policy number, the application destination radio communication unit, the radio setting and the connection permission setting, for example. In the application destination radio communication unit, the radio communication unit 21 to which the setting policy specified by the policy number is applied is set.

The radio setting includes a range of a wireless setting value or a candidate for a setting value permitted to be set for the radio communication unit 21 by the setting policy specified by the policy number. For example, in the radio setting, the stealth status of the service set identifier (SSID), the channel (CH), the band width (BW), the observed BSS power detection (OBSS_PD) and the like are set. In the connection permission setting, a list of terminal stations whose connection is permitted in response to a connection request of the terminal station 4 is set.

FIG. 6 illustrates an exemplary switching policy. As illustrated in FIG. 6, the switching policy includes the policy number, the setting policy number of the switching source, the setting policy number of the switching destination, and the switching condition, for example.

For example, when the terminal station 4 of the type corresponding to the switching condition is connected to the radio communication unit 21 set to the setting policy specified by the setting policy number of the switching source, connection destination switching of the terminal station 4 to the radio communication unit 21 set to the setting policy specified by the setting policy number of the switching destination is performed.

FIG. 7 illustrates exemplary type information of the terminal station 4. As illustrated in FIG. 7, the type information of the terminal station 4 includes the type number and the communication scheme with which the terminal station 4 is compatible. For example, as the communication scheme for the terminal station 4, the compatibility with 40 MHz transmission, the compatibility with OBSS_PD transmission and the like are set.

It is to be noted that in the example illustrated in FIG. 7, the types of the terminal stations are set based on the compatibility with 40 MHz transmission and the compatibility with OBSS_PD transmission, but this is not limitative. The types of the terminal stations 4 may be defined in combination with information of the communication scheme compatible with another terminal station 4.

Next, an exemplary operation of the radio communication system 1 is described.

Figure 8:
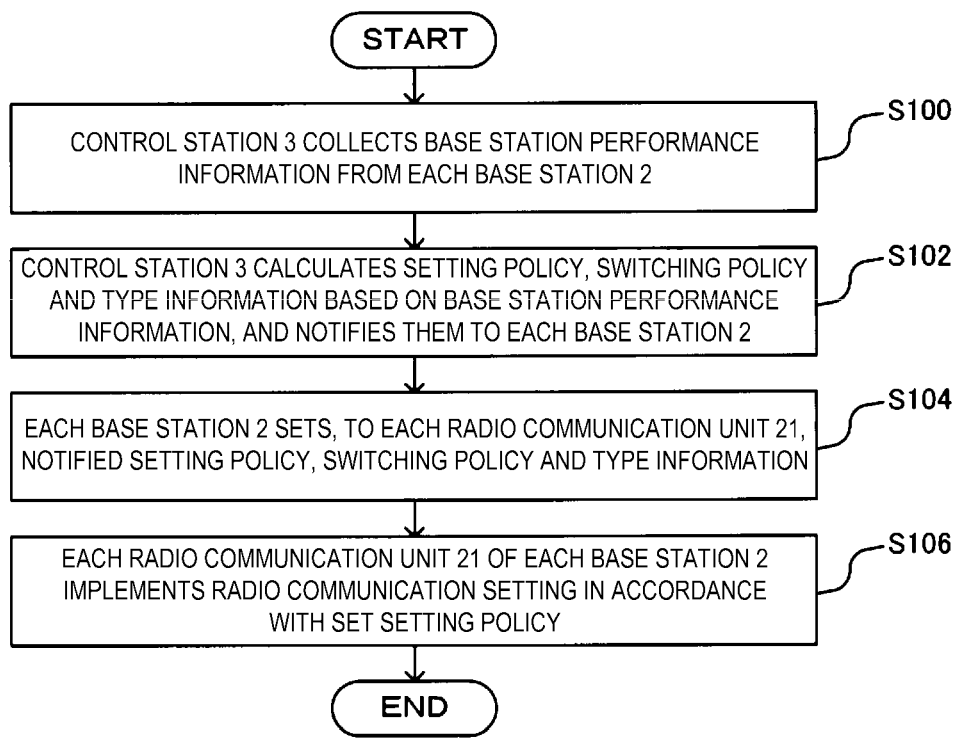
FIG. 8 is a flowchart illustrating an exemplary operation in a case where the radio communication system performs an initial setting for each base station.

FIG. 8 is a flowchart illustrating an exemplary operation of a case where an initial setting for each base station 2 is performed by the radio communication system 1. First, the control station 3 collects the base station performance information from each base station 2 (S100).

Next, on the basis of the base station performance information collected from the base station 2, the control station 3 calculates the setting policy, the switching policy and the type information, and notifies them to each base station 2 (S102).

For example, for the base station 2 in which the number of the radio communication units 21 is 3 (m=3), the control station 3 calculates the setting policy, the switching policy and the type information on the basis of the base station performance information (the number of the radio communication units 21) of the base station 2.

At this time, the policy calculation unit 32 calculates different setting policies for the radio communication units 21-1 to 21-3 of the base station 2.

For example, the radio communication unit 21-1 is caused to accommodate the terminal station 4 that connects to the base station 2 for the first time, and the terminal station 4 that is not compatible with either 40 MHz transmission or OBSS_PD transmission.

The radio communication unit 21-2 is set as a connection switching destination from a connected state to the radio communication unit 21-1, and is caused to accommodate the terminal station 4 that is compatible with 40 MHz transmission.

The radio communication unit 21-3 is set as a connection switching destination from a connected state to the radio communication unit 21-1, and is caused to accommodate the terminal station 4 that is compatible with OBSS_PD in 802.11ax.

In this case, the policy calculation unit 32 calculates a setting policy in which the policy numbers are 01, 02 and 03 (FIG. 5). Further, the policy calculation unit 32 calculates a switching policy in which the policy numbers are I and II (FIG. 6) and type information in which the type numbers are i to iii (FIG. 7).

As a specific example, the base station 2 may connect all the terminal stations 4 that connect to the base station 2 for the first time only to a specific radio communication unit 21 by publicizing only the SSID of the specific radio communication unit 21 to control the connection destination of each terminal station 4 on the basis of the setting policy and the switching policy. At this time, a stealth SSID may be set for the radio communication unit 21 other than the specific radio communication unit 21 such that the terminal station 4 may be connected to the other radio communication unit 21 set to the stealth SSID on the basis of the setting policy and the switching policy.

Next, each base station 2 sets, to each radio communication unit 21 of its own station, the setting policy, the switching policy and the type information notified from the control station 3 (S104).

It is to be noted that each radio communication unit 21 controls an operation of a case where a probe request and/or a connection request is received from the terminal station 4 on the basis of the setting policy, the switching policy and the type information set for itself (details will be described later with reference to FIG. 9).

Then, each radio communication unit 21 of each base station 2 implements a radio communication setting in accordance with the set setting policy (S106).

Figure 9:
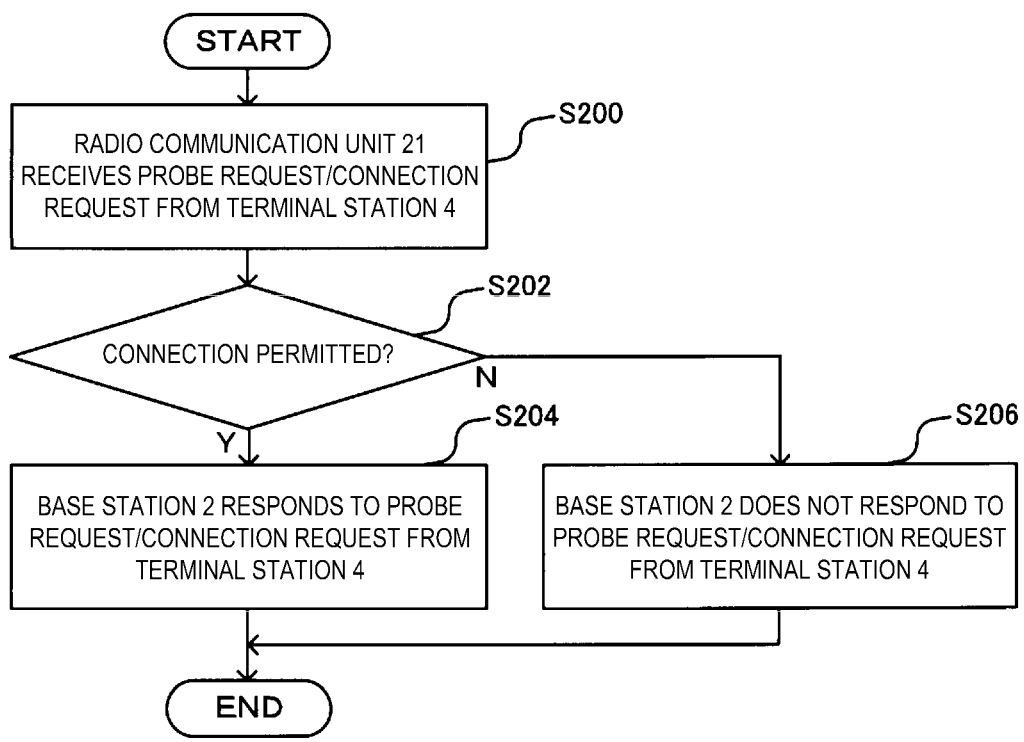
FIG. 9 is a flowchart illustrating an exemplary operation of a case where a probe request frame or a connection request frame is received at a base station from a terminal station.

FIG. 9 is a flowchart illustrating an exemplary operation of a case where the base station 2 receives a probe request frame or a connection request frame from the terminal station 4.

First, the radio communication unit 21 of the base station 2 receives a probe request frame or a connection request frame from the terminal station 4 (S200).

On the basis of a connection permission setting in the setting policy set to the radio communication unit 21, the base station 2 determines whether the connection of the terminal station 4 is permitted (S202).

When the connection of the terminal station 4 is permitted (S202: Yes), the base station 2 responds to the probe request frame or the connection request frame from the terminal station 4 (S204).

In addition, when the connection of the terminal station 4 is not permitted (S202: No), the base station 2 does not respond to the probe request frame or the connection request frame from the terminal station 4 (S206).

Figure 10:
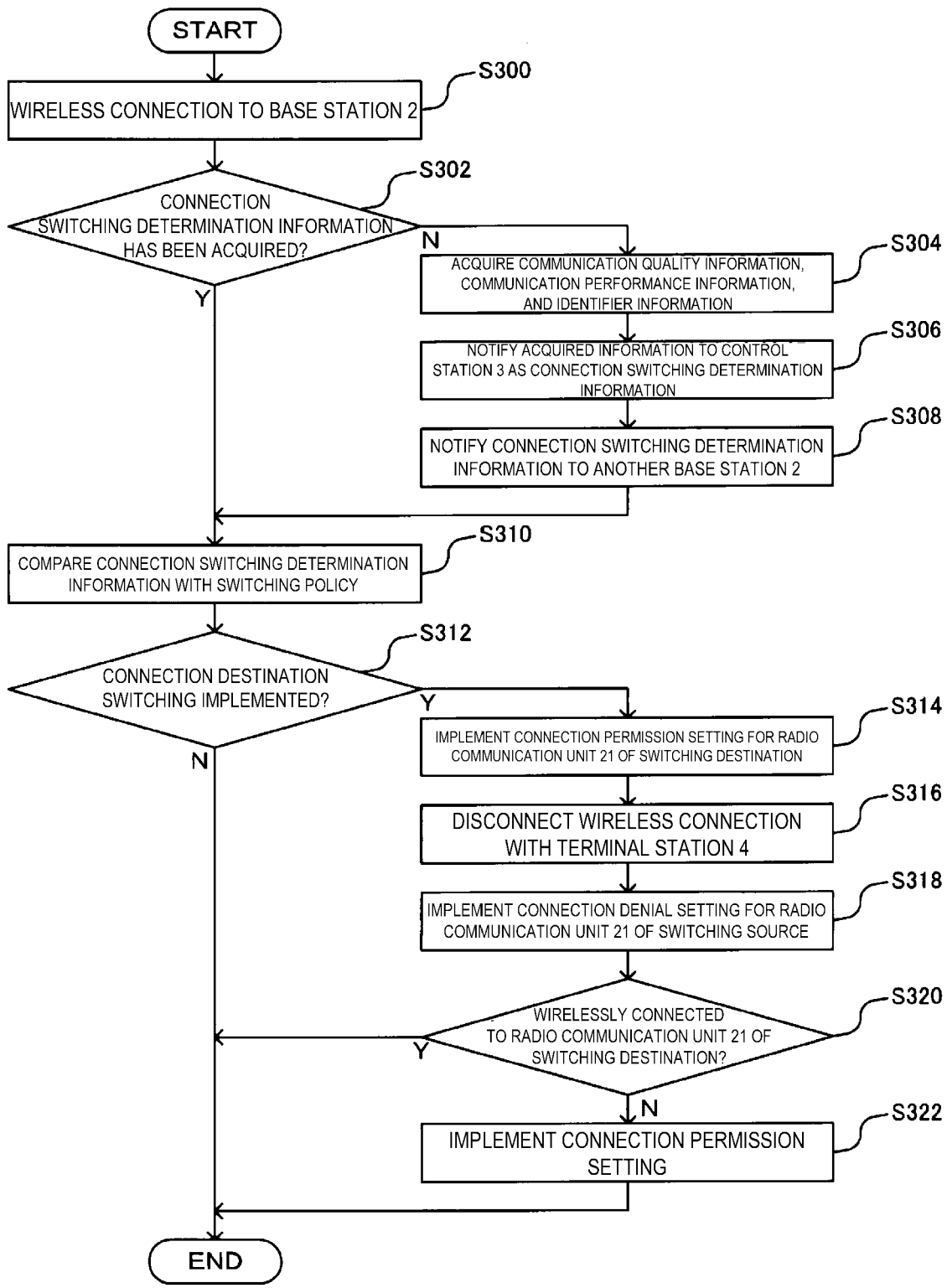
FIG. 10 is a flowchart illustrating an exemplary operation after a terminal station has been wirelessly connected to a base station.

FIG. 10 is a flowchart illustrating an exemplary operation after the terminal station 4 makes a wireless connection to the base station 2. First, the terminal station 4 makes a wireless connection to the base station 2 (S300).

The base station 2 determines whether connection switching determination information for the connected terminal station 4 has been acquired (S302). When the connection switching determination information of the terminal station 4 has been acquired (S302: Yes), the base station 2 proceeds to the process of S310, and when the information has not been acquired (S302: No), the base station 2 proceeds to the process of S304.

The base station 2 acquires communication quality information, communication performance information, and identifier information from the terminal station 4 (S304). It is to be noted that the information acquisition at the process of S304 is performed such that the base station 2 transmits a control signal to the terminal station 4 and that the terminal station 4 that has received the control signal notifies each information to the base station 2, for example. In addition, the terminal station 4 may periodically notify each information to the base station 2 such that the base station 2 collects each information.

In addition, the base station 2 notifies, to the control station 3 through the network 10, the acquired information as connection switching determination information for the terminal station 4 (S306).

The control station 3 notifies, to another base station 2, the connection switching determination information for the terminal station 4 notified from the base station 2 (S308).

Next, the base station 2 compares the connection switching determination information for the terminal station 4 with the switching policy set to the radio communication unit 21 (S310). Then, the base station 2 determines whether to perform the connection destination switching of the terminal station 4 (S312). When the connection destination switching is not to be performed (S312: No), the base station 2 terminates the process, and when the connection destination switching is to be performed (S312: Yes), the base station 2 proceeds to the process of S314.

The base station 2 updates the connection permission setting in the setting policy set to the radio communication unit 21 of the switching destination, to a setting that permits the connection of the terminal station 4. That is, the base station 2 implements another connection permission setting for the radio communication unit 21 of the switching destination (S314).

Next, the base station 2 disconnects the wireless connection with the terminal station 4 (S316), and prompts the switching of the wireless connection destination of the terminal station 4.

Further, the base station 2 updates the connection permission setting in the setting policy set to the radio communication unit 21 of the switching source to a setting of denying the wireless connection with the terminal station 4. That is, the base station 2 implements a connection denial setting for the radio communication unit 21 of the switching source (S318).

The base station 2 determines whether the terminal station 4 has wirelessly connected to the radio communication unit 21 of the switching destination after a certain period has passed (S320). When the base station 2 determines that a wireless connection has been made (S320: Yes), the base station 2 terminates the process, and when the base station 2 determines that no wireless connection has been made, (S320: No) the base station 2 proceeds the process to S322.

Then, the base station 2 updates the connection permission setting in the setting policy set to the radio communication unit 21 of the switching source to a setting of re-permitting the wireless connection with the terminal station 4. That is, the base station 2 implements a connection permission setting of the terminal station 4 for the radio communication unit 21 of the switching source (S322).

As described above, in the radio communication system 1, the base station 2 controls the connection destination of the terminal station 4 on the basis of the setting policy and the switching policy, and it is thus possible to suppress a reduction in transmission efficiency when the terminal station 4 has a plurality of connection destinations. Further, in the radio communication system 1, the base station 2 controls the connection destination of the terminal station 4 on the basis of the setting policy and the switching policy, and it is thus possible to suppress autonomous switching of wireless connection of the terminal station 4.

In addition, in the radio communication system 1, the communication quality information, the communication performance information and the identifier information collected by each base station 2 are transmitted by the control station 3 to other the base station 2, and it is thus possible to reduce the cost of the control and the collection of information when switching the wireless connection of the terminal station 4.

It is to be noted that the base station 2, the control station 3 and the terminal station 4 in the above-described embodiment may be implemented by a general-purpose computer as well as by a dedicated apparatus. In this case, the base station 2, the control station 3 and the terminal station 4 may be implemented by recording programs for implementing the functions of the stations in a computer-readable recording medium and causing a computer system to read the program recorded in the recording medium for execution.

Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system.

Further, "computer-readable recording media" may include those that hold the program dynamically for a short period of time, such as communication lines when the program is transmitted over a network such as the Internet or communication lines such as telephone lines, or those that hold the program for a certain period of time, such as a volatile memory inside a computer system that serves as the server or client in that case.

The above-mentioned program may be used to implement some of the above-mentioned functions, and further, the above-mentioned functions may be implemented in combination with a program that is already recorded in a computer system. In addition, the above-mentioned program may be implemented using hardware such as a programmable logic device (PLD) or a field programmable gate array (FPGA).

Although the embodiment of the present invention has been described above with reference to the drawings, it is clear that the above-mentioned embodiment is merely an example of the present invention and that the present invention is not limited to the above-mentioned embodiment. Therefore, additions, omissions, substitutions, and other modifications of elements may be made insofar as they are within the technical concept and scope of the invention.

REFERENCE SIGNS LIST

1 Radio communication system
2 Base station
3 Control station
4-1 to 4-n Terminal station
10 Network
20 Antenna
21-1 to 21-m Radio communication unit
22 Communication quality collection unit
23 Communication performance collection unit
24 Identifier collection unit
25 Information processing unit
26 Information notification unit
27 Communication unit
28 Setting unit
31 Communication unit
32 Policy calculation unit
33 Storage unit
40 Antenna
41 Radio communication unit
42 Communication quality notification unit
43 Communication performance notification unit
44 Identifier notification unit

The invention claimed is:

1. A radio communication method of connecting a base station with a plurality of terminal stations, the base station including a plurality of radio communication units compatible with a plurality of communication standards or communication schemes, the method comprising:
collecting, from each of the plurality of terminal stations, communication quality information representing a communication quality of the terminal station;
collecting, from each of the plurality of terminal stations, communication performance information representing a communication performance of the terminal station;
collecting, from each of the plurality of terminal stations, identifier information that identifies the terminal station;
calculating, based on the communication quality information, the communication performance information and the identifier information that are collected, a setting policy including a setting for each of the plurality of radio communication units, and a switching policy of setting a condition for switching the plurality of radio communication units; and setting, for each of the plurality of radio communication units, the terminal station for which connection permission and switching are to be performed based on the setting policy and the switching policy that are calculated;

wherein the calculating further includes calculating a setting policy that disables a stealth SSID for one or more of the plurality of radio communication units and enables the stealth SSID for the other radio communication units, and a switching policy that performs connection switching of the plurality of terminal stations in accordance with a plurality of types based on a compatible communication scheme of each of the plurality of radio communication units.

2. The radio communication method according to claim 1, further comprising:

storing the communication quality information, the communication performance information and the identifier information that are collected; and transmitting, to another base station, the communication quality information, the communication performance information and the identifier information that are stored.

3. A base station configured to connect a plurality of terminal stations, the base station comprising:

a plurality of radio communication units compatible with a plurality of communication standards or communication schemes;

a communication quality collection unit configured to collect, from each of the plurality of terminal stations, communication quality information representing a communication quality of the terminal station;

a communication performance collection unit configured to collect, from each of the plurality of terminal stations, communication performance information representing a communication performance of the terminal station;

an identifier collection unit configured to collect, from each of the plurality of terminal stations, identifier information that identifies the terminal station; and a setting unit configured to set, for each of the plurality of radio communication units, the terminal station to be connected in accordance with a switching policy of setting a condition for switching the plurality of radio communication units and a setting policy including a setting for each of the plurality of radio communication units, the switching policy and the setting policy being calculated based on the communication quality information, the communication performance information and the identifier information that are collected;

wherein the setting unit sets, for each of the plurality of radio communication units, the terminal station to be connected in accordance with a setting policy that disables a stealth SSID for one or more of the plurality of radio communication units and enables the stealth SSID for the other radio communication units, and a switching policy that performs connection switching of the plurality of terminal stations in accordance with a plurality of types based on a compatible communication scheme of each of the plurality of radio communication units.

4. A radio communication system comprising:

a plurality of base stations including a plurality of radio communication units that are compatible with a plurality of communication standards or communication schemes and are connectable to a plurality of terminal stations; and a control station configured to control the plurality of base stations, wherein each of the plurality of base stations includes:

a communication quality collection unit configured to collect, from each of the plurality of terminal stations, communication quality information representing a communication quality of the terminal station;

a communication performance collection unit configured to collect, from each of the plurality of terminal stations, communication performance information representing a communication performance of the terminal station;

an identifier collection unit configured to collect, from each of the plurality of terminal stations, identifier information that identifies the terminal station; and a setting unit configured to set, for each of the plurality of radio communication units, the terminal station to be connected based on a setting policy and a switching policy, and the control station includes:

a policy calculation unit configured to calculate a switching policy of setting a condition for switching the plurality of radio communication units and a setting policy including a setting for each of the plurality of radio communication units based on the communication quality information, the communication performance information and the identifier information that are collected by each of the plurality of base stations; and a communication unit configured to transmit, to each of the plurality of base stations, the setting policy and the switching policy that are calculated by the policy calculation unit;

wherein the policy calculation unit calculates a setting policy that disables a stealth SSID for one or more of the plurality of radio communication units and enables the stealth SSID for the other radio communication units, and a switching policy that performs connection switching of the plurality of terminal stations in accordance with a plurality of types based on a compatible communication scheme of each of the plurality of radio communication units.

5. The radio communication system according to claim 4, wherein the control station further includes a storage unit configured to store the communication quality information, the communication performance information and the identifier information that are collected by each of the plurality of base stations, and the communication unit transmits, to another base station, the communication quality information, the communication performance information and the identifier information that are stored in the storage unit.

* * * * *